United States Patent [19]
du Chaffaut et al.

[11] 3,904,485
[45] Sept. 9, 1975

[54] PURIFICATION OF A MICRO-ORGANISM

[75] Inventors: Jean Amaudric du Chaffaut, Marseille; Jean Claude Hondermarck; Bernard Maurice Laine, both of Lavera, all of France

[73] Assignee: The British Petroleum Company Limited, London, England

[22] Filed: Mar. 18, 1971

[21] Appl. No.: 125,832

Related U.S. Application Data

[63] Continuation of Ser. No. 694,115, Dec. 28, 1967, abandoned.

[52] U.S. Cl. ............... 203/56; 195/28 R; 203/56; 203/63; 203/70
[51] Int. Cl.[2] .................... B01D 3/34; C12B 1/00
[58] Field of Search ............ 195/3, 3 H, 28 R, 1, 2, 195/4, 80, 82, 109, 96; 203/56, 63, 70

[56] References Cited
UNITED STATES PATENTS

| | | | |
|---|---|---|---|
| 3,268,419 | 8/1966 | Champagnat et al. | 195/82 |
| 3,293,145 | 12/1966 | Leavitt et al. | 195/80 |
| 3,520,777 | 7/1970 | Filosa | 195/3 H |
| 3,616,209 | 10/1971 | Laine et al. | 195/28 |

*Primary Examiner*—Norman Yudnoff
*Assistant Examiner*—Curtis P. Ribando
*Attorney, Agent, or Firm*—Morgan, Finnegan, Pine, Foley & Lee

[57] ABSTRACT

Treatment of a micro-organism containing material in which there is present an evaporable material and water, said water being present in an amount greater than 20% based on the dry weight of the micro-organism, the micro-organism being treated to remove part or the whole of the evaporable material while maintaining at least 20% of water, based on the dry weight of the micro-organism, in association with said micro-organism. Optionally, water may first be removed to reduce the water content to at least 20%. Optionally further water may be removed after the evaporable material has been removed.

The micro-organism containing material may be obtained by solvent extraction of a micro-organism which has been grown on a hydrocarbon substrate.

4 Claims, No Drawings

PURIFICATION OF A MICRO-ORGANISM

REFERENCE TO CO-PENDING APPLICATION

This is a continuation of aplication Ser. No. 694,115, filed Dec. 28, 1967, and now abandoned.

This invention relates to a process for the purification of a micro-organism. The invention also relates to a process of cultivation and purification of a micro-organism.

Processes have been described in the prior art for the solvent extraction of micro-organism-containing fractions for the removal of lipids and/or contaminants.

As a result of solvent extraction or as a result of other treatment or methods of growth of micro-organism, there may be obtained a micro-organism product which has associated therewith water and a material which is foreign to the micro-organism itself. This material will in certain cases have a boiling point such that, under suitable conditions, the material can be evaporated substantially completely while leaving some of said water in association with the micro-organism; a material having this character is hereinafter referred to as the "evaporable material".

We have found that under certain conditions the evaporation of the fluids associated with the micro-organism may lead to a micro-organism product having some of the evaporable material in association with the micro-organism, the nature of the association being such that the evaporable material is not removable by conventional methods such as heating or further solvent extraction.

Furthermore we have found that in the presence of a certain amount of water the micro-organism fails to form this association (at least in a manner which hinders removal of the evaporable material).

Furthermore we have found that the removal of some water, in certain cases the bulk of the water, from the micro-organism containing material, may be achieved without the formation of said association.

According to one aspect of the present invention there is provided a process which comprises treating a micro-organism containing material wherein there is present an evaporable material and water, said water being present in an amount greater than 20% based on the dry weight of the micro-organism, said micro-organism being treated to remove part or the whole of said evaporable material while maintaining at least 20% of water, based on the dry weight of the micro-organism, in association with said micro-organism.

According to a second aspect of this invention there is provided a process which comprises treating a micro-organism-containing material wherein there is present an evaporable material and water, said water being present in an amount greater than 20% based on the weight of the micro-organism in the dry state, said micro-organism being treated to remove part of said water and provide a micro-organism containing material, hereinafter referred to as the 'concentrate', which still contains at least 20% of water based on the dry weight of the micro-organism, thereafter removing the evaporable material or the residue of the evaporable material from the concentrate while maintaining at least 20% of water based on dry weight of the micro-organism in association with the micro-organism.

It will be manifest that special care is required to ensure that the evaporable material is removed from association with the micro-organism while maintaining at least 20% by weight of water in association with the micro-organism.

The removal of the evaporable material may be effected by the application of heat and/or reduced pressure under conditions such that (a) the removal of the evaporable material takes place before the removal of water or (b) under conditions such that evaporable material and water are removed together, with replacement of at least part of the fluid so removed by addition of water to the micro-organism.

Method (a) above may be carried out by a multistage, preferably two stage, evaporation or by employing a stripping agent to remove the evaporable material preferentially.

According to a third aspect of the present invention there is provided a process which comprises maintaining a micro-organism-containing material, containing a micro-organism which has associated therewith (a) water in excess of the water present in the living micro-organism in the dry state and (b) an evaporable material, as hereinbefore defined, said material being maintained under conditions such that the evaporable material is removed by evaporation while leaving some of said water in association with the micro-organism.

If desired, the process may be applied to a material as hereinbefore described in which the evaporable material has a boiling point close to or above that of water. In this case the micro-organism-containing material may be treated by maintaining the micro-organism-containing material at a suitable temperature and/or reduced pressure with the addition of water in order to maintain water in association with the micro-organism. If desired a stripping agent may be employed.

The process according to any of the aspects of the invention herein described is particularly suitable for the treatment of a micro-organism-containing material, as hereinbefore described, in which the evaporable material, as hereinbefore, defined, has a boiling point below that of water; such a material will be referred to herein for convenience as a "volatile material".

According to a fourth aspect of the present invention there is provided a process which comprises maintaining a micro-organism-containing material, containing a micro-organism which has associated therewith (a) water in excess of the water present in the micro-organism in the dry state and (b) a volatile material, as hereinbefore defined, at a temperature above that at which, under the prevailing conditions, the volatile material is removable by evaporation and below that at which water is removed at a significant rate by evaporation, and, while thus maintaining said micro-organism, removing said volatile material by evaporation.

Initially, part of the water may be removed from the micro-organism under conditions of rapid removal for example using a spray drier, operated to obtain a product containing at least 20% by weight of water in association with the micro-organism.

Preferably said evaporable material is removed by maintaining the micro-organism in proximity to a heated surface. Preferably the micro-organism is maintained in movement relative to the surface.

Suitably there is employed a screw conveyor operating with the provision of heat to the screw. If desired the conveyor may be heat jacketed.

By suitably distributing heat to the screw conveyor, and/or to a jacket if this is employed, the conveyor may serve the dual function of removing evaporable material while maintaining a desired level of water in the micro-organism and thereafter removing all or part of the residual water.

Suitably the micro-organism containing material is maintained in movement, relative to the surface of the conveyor, by the provision, in the conveyor system, of fixed baffles co-operating with a helical screw by which said material is propelled through an enclosing tube. Suitably the screw has a hollow shaft and is steam heated. The conveyor will normally be operated in continuous manner, fresh material being fed in by hopper. Preferably the system is enclosed and pressurised with inert gas to exclude, at least in large measure, atmospheric oxygen.

If desired, the evaporable material and, thereafter, at least part of the residual water may be removed from the micro-organism by means of a tray dryer having a heated surface swept by scraper-dispatchers, the tray dryer usually being operated batchwise.

Preferably at no time is the amount of water in association with the micro-organism allowed to fall below 20% by weight, based on the weight of the micro-organism in the dry state, while the micro-organism is in association with the evaporable material.

By the term "micro-organism in dry state" we mean a micro-organism in the state obtained by drying at 120°C. By "dry weight of a micro-organism" we mean the weight of a micro-organism in said state.

If desired the product thereby obtained may be further treated to remove all or part of the remaining water associated with the micro-organism. Suitably this may be effected by spray drying or by passage in contact with a heated conveyor.

Preferably the process is applied to a micro-organism-containing material in which the total amount of evaporable material as hereinbefore defined is not more than 50% by weight of the water which is in association with the micro-organism (said water being the water in excess of that present in the micro-organism in the dry state).

Evaporable materials which may be removed in accordance with the process of the invention are materials hereinafter described as solvents for use in solvent extraction of a contaminated micro-organism. In particular the process is suitable for the removal of normal hexane or isopropanol or mixtures thereof from association with a micro-organism.

According to another aspect of the present invention there is provided a process which comprises aerobically cultivating a hydrocarbon-consuming micro-organism in the presence of a substrate comprising an hydrocarbon consumable by the micro-organism, recovering a product fraction comprising a hydrocarbon-contaminated micro-organism, thereafter, with or without an intervening recovery or purifying stage, subjecting the hydrocarbon-contaminated micro-organism in the presence of water to solvent extraction and thereafter treating a micro-organism-containing material, containing a micro-organism associated with an evaporable material and water by a process as hereinbefore described.

Usually the straight-chain hydrocarbons will be present in the feedstock to the cultivation stage as paraffins; however, the straight chain hydrocarbons may be present as olefins; also there may be used a mixture containing straight chain paraffins and olefins.

Suitable feedstocks to the process of the invention include kerosine, gas oils and lubricating oils; these feedstocks may be unrefined or may have undergone some refinery treatment, but must contain a proportion of straight chain hydrocarbons in order to fulfil the purpose of this invention. Suitably the petroleum fraction will contain 3–45% by weight of straight chain hydrocarbons.

The process of the invention is of particular value for the treatment of petroleum gas oil fractions which contain straight chain hydrocarbons in the form of waxes, since by the process of the invention a gas oil of improved pour point is obtained while the waxes are converted to a valuable product.

By the application of this process under conditions which limit the metabolisation of the straight chain hydrocarbons it is possible to operate with the removal of only a desired proportion of these hydrocarbons.

Within the term 'micro-organism' used herein we include mixtures of micro-organisms. Preferably the micro-organism is capable of growing on at least some normal paraffins.

Micro-organisms which are cultivated as herein described may be yeasts, moulds or bacteria.

The yeasts in this specification are classified according to the classification system outlined in "The Yeasts, a Taxonomic Study" by J. Lodder and W. J. W. Kreger-Van Rij, published by North Holland Publishing Co. (Amsterdam) (1952).

The bacteria mentioned in this specification are classified according to the classification system outlined in "Bergey's Manual of Determinative Bacteriology" by R. S. Breed, E. G. D. Murray and N. R. Smith, published by Bailliere, Tindall and Cox (London) 7th Edition (1957).

Preferably when a yeast is employed this is of the family Cryptococcaceae and particularly of the sub-family Cryptococcoideae however, if desired there may be used, for example, ascosporogeneous yeasts of the sub-family Saccharomycoideae. Preferred genera of the Cryptococcoideae sub-family are Torulopsis (also known as Torula) and Candida. Preferred species of yeast are as follows. In particular it is preferred to use the specific stock of indicated Baarn reference number; these reference numbers refer to CBS stock held by the Centraal Bureau vor Schimmelculture, Baarn, Holland and to INRA stock held by the Institut National de la Recherche Agronomique, Paris, France.

|  |  | Preferred strain |
|---|---|---|
| Candida | lipolytica |  |
| Candida | pulcherrima | CBS 610 |
| Candida | utilis |  |
| Candida | utilis, Variati major | CBS 841 |
| Candida | tropicalis | CBS 2317 |
| Torulopsis | colliculosa | CBS 133 |
| Hansenula | anomala | CBS 110 |
| Oidium | lactis |  |
| Neurospora | sitophila |  |
| Mycoderma | cancoillote | INRA: STV 11 |

Of the above Candida lipolytica and C. tropicolis are particularly preferred.

If desired the micro-organism may be a mould. Suitable moulds are Penicillium and preferably there is used Penicillium expansum. Another suitable genus is Aspergillus.

If desired the micro-organism may be a bacterium. Suitable the bacteria are of one of the orders:-
Pseudomonadales, Eubacteriales and Actinomycetals.
Preferably the bacteria which are employed are of the families Corynebacteriaceae, Micrococcaceae,

*Achromobacteraceae, Actincymycetaceae, Rhizobiaceae, Bacillaceae* and *Pseudomonadaceae*. Preferred species are *Bacillus megaterium*, *Bacillus subtilis* and *Pseudomonas aeruginosa*. Other species which may be employed include:-

Bacillus amylobacter
Pseudomonas natriegens
Arthrobacter sp.
Micrococcus sp.
Corynebacterium sp.
Pseudomonas syringae
Xanthomonas begoniae
Flavobacterium devorans
Acetobacter sp.
Actinomyces sp.
Nocardia opaca These bacteria grow in the presence of the following aqueous nutrient medium:-

| | |
|---|---|
| $NH_4Cl$ | 0.5 grams |
| NaCl | 4 grams |
| $MgSO_4.7H_2O$ | 0.5 grams |
| $NaHPO_4.12H_2O$ | 0.5 grams |
| $KH_2PO_4$ | 0.5 grams |
| Water to make up to: | 1000 mls. |

Preferably the pH of this medium is maintained at 7. Another aqueous nutrient medium is:-

| | |
|---|---|
| $K_2HPO_4$ | 1 gram |
| $KH_2PO_4$ | 0.5 grams |
| $MgSO_4.7H_2O$ | 0.5 grams |
| $CaCl_2$ | 0.1 grams |
| NaCl | 0.1 grams |
| Water to make up to: | 1000 mls. |

A suitable nutrient medium for yeasts and moulds has the composition:-

| | |
|---|---|
| $(NH_4)_2HPO_4$ | 2 grams |
| KCl | 1.15 grams |
| $MgSO_4.7H_2O$ | 0.65 grams |
| $ZnSO_4$ | 0.17 grams |
| $MnSO_4.4H_2O$ | 0.045 grams |
| $FeSO_4.7H_2O$ | 0.068 grams |
| Tap water | 200 mls. |
| Yeast extract | 0.025 grams |
| Distilled water (to make up to 1000 mls.) | |

The growth of the micro-organism used in favoured by the addition of the culture medium of a very small proportion of extract of yeast (an industrial product rich in essential nutrilites, that is, growth factors obtained by the hydrolysis of a yeast) or more generally of the essential nutrilites. The essential nutrilites include biotin, pantothenic acid, nicotinic acid, thiamine, inositol, and pyridoxine. The quantity of yeast extract added is preferably of the order of 25 parts per million. The quantity of each nutrilite required varies between about 0.1 parts per million for biotin to about 10 parts per million for inositol.

Preferably the aqueous nutrient medium is maintained at a desired pH by the step-wise or continuous addition of an aqueous medium of high pH value. Usually, when using moulds or yeasts and in particular when using *Candida lipolytica*, the pH of the nutrient medium will be maintained in the range 3–6 and preferably in the range of 4–5. (Bacteria require a higher pH usually 6.5–8). Suitable alkaline materials for addition to the growth mixture include sodium hydroxide, potassium hydroxide, disodium hydrogen phosphate and ammonia, either free or in aqueous solution.

The optimum temperature of the growth mixture will vary according to the type of micro-organism employed and will usually lie in the range 25°–35°C. When using *Candida lipolytica* the preferred temperature range is 28°–32°C.

The take-up of oxygen is essential for the growth of the micro-organism. The oxygen will usually be provided as air. In order to maintain a rapid rate of growth, the air, used to provide oxygen, should be present in the form of fine bubbles under the action of stirring. The air may be introduced through a sintered surface. However there may be used the system of intimate aeration known as "vortex aeration".

The growth operation will usually be carried out in continuous manner; however, batch operation may be employed if desired. After the growth stage it will usually be possible to separate the micro-organism, contaminated with some unmetabolised feedstock and aqueous nutrient medium, from the bulk of the unmetabolised feedstock fraction. Preferably the separation is achieved by means of a decantation; additionally or alternatively centrifuging may be used. The fraction containing the micro-organism is preferably now subjected to treatment with an aqueous treating medium containing a surface active agent.

Preferably the micro-organism fraction is vigorously mixed with the aqueous surface-active agent, and, without a further period of growth of the micro-organism, is subjected to further separation, preferably by centrifuging, to recover a micro-organism fraction and a spent aqueous phase containing hydrocarbon impurities removed from the micro-organism. If necessary, the washing and separating steps may be repeated, once or more, using an aqueous surface-active agent in the washing stage. After washing with surface-active agent it is necessary to wash with an aqueous medium which is free of surface active agent; preferably this medium will be water. Again if desired, a series of washing and separation stages may be employed.

Preferably the washing stages are carried out until the hydrocarbon content of the micro-organism is less than 7% based on the weight of the micro-organism (as calculated for the dry state). Preferably said content of hydrocarbons will be less than 5%.

As the surface active agent employed for washing there may be used cationic surface-active agents such as stearyltrimethyl ammonium chloride, non-ionic surface-active agents, for example the condensates of oleic acid and ethylene oxide, or anionic surface-active agents, for example sodium alkyl sulphates.

The fraction containing the micro-organism will usually then be subjected to solvent extraction. Preferably, in a first extraction stage consisting of one or more extraction steps, the contaminated solid material is extracted with a mixture of an alcohol and a hydrocarbon with which it forms an azeotrope hereinafter referred to as the "azeotrope forming hydrocarbon", said alcohol and azeotrope forming hydrocarbon respectively being employed at a ratio by volume within the range 30:70 to 70:30.

Suitably a multi-stage system is employed; thus, in a second extraction stage consisting of one or more extraction steps, the treated solid material from the first stage may be extracted with an azeotropic mixture of the alcohol and the azeotrope of forming hydrocarbon, thereafter recovering the treated solid material. Separately or after blending, the extract fractions from the first and second extraction stages may be fed to a distillation stage, consisting of one or more distillation steps, for the separate recovery of (a) an azeotropic mixture of the alcohol and the azeotrope forming hydrocarbon, (b) an azeotropic mixture of the alcohol and water and (c) a residue fraction, thereafter blending substantially all of the azeotropic mixture of the alcohol and water with part of the azeotropic mixture of the alcohol and azeotrope forming hydrocarbon, the part being selected to give a mixture of the alcohol and azeotrope forming hydrocarbon containing these materials respectively at a ratio by volume in the range 30:70 to 70:30 and recycling this mixture to the first extraction stage.

Suitably the temperature of the extraction steps lies in the range 30°–60°C.

Suitable the azeotrope-forming hydrocarbon is normal hexane.

Suitably the alcohol is ethanol, propanol, isopropanol or a butanol.

Suitably the process of the invention is applied to a crude or partially refined product of the growth of a micro-organism on a hydrocarbon substrate in the presence of an aqueous nutrient medium.

Preferably the micro-organism when subjected to solvent extraction contains at least 20% by weight, more particularly 100–200% by weight of water (based on dry pure yeast weight).

If necessary the yeast may be mixed with water before extraction.

Preferably the ratio of water to alcohol and azeotrope forming hydrocarbon in the step or steps of the extraction stage or off the first extraction stage lies in the range 1:4 to 1:10 by weight.

If desired, the extraction as hereinbefore described may be repeated, preferably after addition of water to the yeast to give a water content as in the first stage.

The hydrocarbons recovered in the extract phase by solvent extraction, if metabolisable, may be recycled to the micro-organism cultivation stage.

The micro-organism-containing material, recovered after solvent extraction and containing water and an evaporable material consisting of or comprising the solvent, will be further treated as hereinbefore described for the removal of part or the whole of the evaporable material.

A yeast which has been freed from the whole or part of its lipids and the contaminating hydrocarbons by one of the methods described hereinbefore is a new industrial product.

According to a preferred feature of this invention there is provided a process which comprises cultivating a micro-organism in a manner as hereinbefore described in the presence of a petroleum fraction consisting in part of straight chain hydrocarbons and having a mean molecular weight corresponding to at least 10 carbon atoms per molecule, and in the presence of an aqueous nutrient medium; and in the presence of a gas containing free oxygen, and separating from the mixture, on the one hand, the micro-organism and, on the other hand, a petroleum fraction having a reduced proportion of straight chain hydrocarbons or which is free of said straight chain hydrocarbons and thereafter treating the micro-organism as hereinbefore described.

Any one stage, or more than one stage or all stages of the process hereinbefore described may be operated either batchwise or continuously.

Preferred methods for use in the cultivation of the micro-organism and for the recovery of the product are described in British Patent Specification Nos. 914567 and 914568 — also in British Patent Application Nos.:-

| | |
|---|---|
| 36873/62 (SFP 1125) | 49062/62 (SFP 1420) |
| 44606/63 (SFP 1300) | 49063/62 (SFP 1421) |
| 46906/62 (SFP 1300-A) | 45004/63 (SFP 1626) |
| 19918/63 (SFP 1400) | 45005/63 (SFP 1627) |
| 25210/63 (SFP 1401) | 45002/63 (SFP 1628) |
| 44998/63 (SFP 1603) | 7623/63 (SFP 1629) |
| 2234/63 (SFP 1404) | 19271/63 (SFP 1440) |
| 49049/62 (SFP 1407) | 45001/63 (SFP 1641) |
| 49050/62 (SFP 1408) | 25229/64 (SFP 1644) |
| 45102/63 (SFP 1609) | 38942/63 (SFP 1508) |
| 49052/62 (SFP 1410) | 183/65 (SFP 1512) |
| 49055/62 (SFP 1413) | 184/64 (TD 1513) |
| 45010/63 (SFP 1612) | 11860/64 (SFP 1516) |
| 49056/62 (SFP 1414) | 182/64 (SFP 1522) |
| 49057/62 (SFP 1415) | 46411/63 (SFP 1532) |
| 45009/62 (SFP 1616) | 21209/64 (SFP 1574) |
| 49060/62 (SFP 1418) | 26498/64 (SFP 1575) |
| 49061/62 (SFP 1419) | 22743/64 (RSO 1618) |
| 5085/64 (SFP 1749) | 25229/64 (SFP 1644) |
| 25648/65 (SFP 1779) | 11703/65 (RSO 1761) |
| 28092/65 (SFP 1125-D) | 27284/65 (SFP 1676) |
| 31457/65 (SFP 1714) | 28766/65 (SFP 1796) |
| 32648/65 (RSO 1806) | 32645/65 (SFP 1795) |
| 32650/65 (SFP 1808) | 32649/65 (SFP 1807) |
| 45662/65 (RSO 1855) | 44388/65 (SFP 1700) |
| 59954/65 (TD 1875) | 49604/65 (RSO 1860) |

— also in the Specification of French Patent Application No.: 924254 (SFP 1402)

The invention is illustrated but not limited with reference to the following Examples.

EXAMPLE 1

40 litres of aqueous mineral nutrient medium having the composition given hereinafter, was introduced into a stainless steel fermenter having an effective capacity of 60 litres.

The composition of the aqueous nutrient medium was as follows:

| | |
|---|---|
| diammonium hydrogen phosphate | 2 |
| potassium chloride | 1.15 |
| magnesium sulphate $7H_2O$ | 0.65 |
| zinc sulphate | 0.17 |
| maganese sulphate $4H_2O$ | 0.068 |
| ferrous sulphate | 0.124 |
| yeast extract | 0.030 |
| tap water | 200 |
| distilled water to 1000 ml. | |

20 litres of a 24 hour inoculum of Candida lipolytica on mixed $C_{10}$–$C_{20}$ normal hydrocarbons were then added, such that the cellular density was about 1 gr of dry matter per litre.

1.030 litre of heavy gas oil, that is 15 grams/litre were then added, this quantity being sufficient to take the cellular density to 2 grams/litre.

The temperature of the culture was kept at 30°± 1°C by means of water which was circulated in an annulus constituted by the space between two concentric cylinders, the smaller one being ther fermenter itself.

Aeration and agitation were such that the rate of aeration was 3 millimoles of $O_2$ per litre of medium per minute.

pH as maintained at 4 by addition of ammonia solution which was introduced through an automatic pH controlling system. When the flow of ammonia reached 20 ml, the addition of gas oil was started. The gas had the following specification:-

| | |
|---|---|
| specific gravity | 0.870 |
| pour point | + 15°C |
| boiling range | 300 – 390°C |

The rate of addition was determined by the theoretical needs of the culture, assuming a yield on gas oil [(dry yeast produced)/(gas oil feedstock)] of 10% by weight and cellular division time of 3 hours. This addition was carried out every hour until the total amount of gas oil reached 200 g/litre, i.e. 13.8 litres.

Starting with a cellular density of 2 grams/litre, at 25 hours (the end of the exponential growth phase) the celldensity was 15 g/litre.

The fermenter was then run continuously at a dilution rate of 0.2 vol/vol/hr, cellular density remaining constant at 15 gr/litre throughout the run.

Broth was continuously withdrawn from the fermenter and subjected to decantation, 65% of spent medium being withdrawn and replaced in the recovered broth by 65% of tap water.

To the upper phase was added 0.5 gram/litre of the non ionic detergent sold under the trade name "NI 29" and after centrifuging there were separately recovered:

| | | |
|---|---|---|
| spent mineral medium | 840 | grams/litre |
| non metabolised gas oil | 110 | " |
| paste of micro-organism | 50 | " |

The paste of micro-organism was then rinsed with water at ambient temperature and centrifuged; the yeast obtained then contained 65 to 70% of water.

Water was partly removed in order to produce a yeast paste consisting of 50% of dry yeast and 50% of water by weight.

This wet yeast was then pumped into an extractor which was in the form of a filtering drum which was rotated with its axis horizontal. A solvent mixture consisting of 50% of hexane and 50% of isopropanol was added to the wet yeast at a rate of 8 parts of mixture per part of a dry yeast. The whole mixture, yeast + water + solvents, was maintained at 60°C for 30 min. Then, the solvent containing the major part of yeast impurities was drawn off.

Water was added to the remaining yeast to give a yeast paste consisting of 50% of dry yeast by weight. A fresh solvent mixture of 50% of normal hexane and 50% of isopropanol was added to the wet yeast at a rate of 8 parts of mixture per part of dry yeast.

The mixture of yeast, water and solvent, was maintained at 60°C for 30 min. Then the solvent containing some residual parts of yeast impurities was drawn off.

Analytical data of the yeast after solvent extraction is given in the following Table 1.

Table 1

| | |
|---|---|
| Moisture | 68.4% by wt |
| Nitrogen | 10.5% by wt of dry yeast |
| Lipids | 0.3% by wt. " |
| Residual hexane | 6.8% by wt " |
| Residual isopropanol | 31.0% by wt " |

The recovered solvents after blending were fed to a distillation stage for the separate recovery of an azeotropic mixture of the isopropanol and the n-hexane, an azeotropic mixture of the alcohol and water, and a residue containing all the lipids and impurities. These azeotropic mixtures were then blended to achieve a new batch of solvent for a next extraction.

The yeast paste obtained after solvent extraction was then sent to a tray dryer having a heated surface swept by 4 stainless steel scraper dispatchers and operating batchwise at atmospheric pressure. The removal of residual solvents and water was as shown in the following Table 2.

Table 2

| | Operating conditions | | | Analytical data of yeast paste | | |
|---|---|---|---|---|---|---|
| | Time Minute | Temperature °C | Pressure | Moisture % by wt. | Hexane % by wt. | IPA % by wt. |
| Product feedstock | 0 | 60 | atmosph. | 68.4 | 6.8 | 31.0 |
| | 15 | 84 | " | 55.9 | <0.05 | 15.2 |
| | 30 | 94 | " | 34.4 | " | 0.2 |
| | 45 | 106 | " | 6.2 | " | <0.2 |
| | 60 | 117 | " | 1.9 | " | " |
| | 65 | 120 | " | 1.6 | " | " |

As it can be seen after 1 hour the yeast product was entirely freed of solvent and almost completely dried. Hexane was first removed, followed by IPA, and then water was removed.

EXAMPLE 2

The yeast C. lipolytica was subjected to growth, harvesting and extraction as described in Example 1, and as described, a wet solvent containing yeast paste was obtained:

This wet product was sent in a series of passes through a screw conveyor dryer having a jacketted trough covered by a lid and having the following characteristics:-

| | |
|---|---|
| Total volume | 30 dm3 |
| Pressure in the trough | 1 atmosphere |
| Pressure in the double wall of the trough | 10 atmospheres |
| Exchange surface | 0.4 m2 |
| Exit temperature of steam from double wall | 142°C |

Screws were of double jacketted type with circulation of steam at 2.5 atmospheres. They were of discontinuous type.

| | |
|---|---|
| Diameter | 130 mm |
| Length | 900 mm |
| Pressure in | 10 atmospheres |
| Rpm | 1 |
| Exchange surface | 0.45 m2 |

All the front surface of the spiral of the screws are equipped with Teflon strips playing the role of scrapers.

All surfaces in contact with the product treated are in stainless steel.

Run and analytical data are given in the following Table 3:-

Table 3

| | Analytical data of yeast | | | |
|---|---|---|---|---|
| | Weight engaged kg | Moisture % by wt. | IPA % by wt. | Hexane % by wt. |
| Feedstock to drier | 269 | 74.9 | 35.7 | 7.7 |
| After: | | | | |
| pass 1 | 188 | 61.1 | 20.7 | traces |
| pass 2 | 135 | 47.9 | 3.4 | 0 |
| pass 3 | 115 | 38.3 | 0.7 | 0 |
| pass 4 | 102 | 30.0 | 0.4 | 0 |
| pass 5 | 93 | 24.9 | 0.2 | 0 |

After 5 passes, the product was entirely free of solvent but some water remained. To eliminate this latter three further passes were required.

EXAMPLE 3

The yeast *C. lipolytica* was subjected to growth harvesting and extraction as described in Example 1.

The wet product containing some solvent was continuously fed to a Holoflite screw conveyor.

The heated surfaces of the screw conveyor were at 160°C and the rate of revolution of the helical screw was 1 rpm. Other characteristics of the dryer are:-

Constituted by a jacketted trough, with lid, containing two screws of 130 mm of diameter, 900 mm length. The screws with 2 to 5 kg of steam. The jacket of the trough and the lid could be fed to a pressure of 1 kg/cm2.

| exchange surface of screws | 0.9 m2 |
|---|---|
| capacity of the dryer | 11 litres |

Flow of the order of 25 to 30 kg/h.

All surfaces of the apparatus in contact with yeast paste are in stainless steel.

The product (wet extracted yeast) was passed several times through the screw conveyor; results were as shown in the following Table 4:-

Table 4

| | Operating Conditions | Yeast analytical data | | |
|---|---|---|---|---|
| | | moisture % by wt. | hexane % by wt. | IPA % by wt. |
| Product feedstock Number of passages | | 63.4 | 3.7 | 26.9 |
| | T° = 160°C rpm = 1 | | | |
| pass 1 | " | 55 | <0.1 | 11.6 |
| pass 2 | " | — | nil | 0.9 |
| pass 3 | " | 26 | — | 0.2 |
| pass 4 | " | 15 | — | <0.1 |
| pass 5 | " | 6 | — | — |

Hexane and IPA were completely removed, while water was slowly removed.

The final product obtained was a concentrate of protein free from any solvent and with a low content of water.

The surface active agent NI 29 is a non-ionic surface active agent obtained by condensing ethylene oxide with lauryl alcohol to give an ethylene oxide chain of an average of 8.5 units per molecule.

Other surface active agents which may be used in the process of the invention include (a) an anionic surface active agent obtained by sulphation of the said non-ionic surface active agent (that is an oxyethylenated lauric alcohol sulphate) and (b) a non-ionic surface active agent obtained by condensing ethylene oxide with a mixture of lauryl alcohol and myristic alcohol.

What is claimed is:

1. A process for the removal of an evaporable organic solvent from a straight chain hydrocarbon-consuming micro-organism containing material contaminated therewith, wherein said material is obtained by cultivating a straight chain hydrocarbon-consuming micro-organism in the presence of a substrate comprising a straight chain hydrocarbon consumable by the micro-organism, recovering a product fraction comprising a hydrocarbon contaminated micro-organism, thereafter subjecting the hydrocarbon contaminated micro-organism in the presence of water to an extraction treatment with an organic solvent selected from the group consisting of ethanol, propanol, isopropanol, butanol, hexane and mixtures thereof whereby contaminant hydrocarbon is removed to give a material containing the micro-organism, water and solvent, said solvent having a boiling point such that it can be removed from said material while having at least some of said water in association with said micro-organism, said water being present in an amount greater than 20% by weight based on the dry weight of the micro-organism and said solvent being present in an amount which is not more than 50% by weight of said water, said process comprising of treating said material by the application of heat and/or reduced pressure at a temperature at which under the prevailing conditions solvent is removable by evaporation and below that which water is removed at a significant rate by evaporation whereby at all times at least 20% water based on the dry weight of the micro-organism is maintained in association with the micro-organism and while thus maintaining said material at said temperature to remove said solvent.

2. A process as claimed in claim 1 wherein the micro-organism containing material is treated to remove part of said water and provide a concentrate, which still contains at least 20% of water based on the dry weight of the micro-organism, thereafter treating the concentrate to remove part or the whole of said evaporable material.

3. A process as claimed in claim 1 in which, after removal of the evaporable material, the product obtained is further treated to remove all or part of the remaining water associated with the micro-organism.

4. A process as claimed in claim 1 in which the evaporable material is normal hexane.

* * * * *